US009098929B1

(12) United States Patent
Wakim (10) Patent No.: US 9,098,929 B1
(45) Date of Patent: Aug. 4, 2015

(54) SYSTEMS AND METHODS FOR PRESENTING POINT OF INTEREST INDICATORS (75) Inventor: Peter A. Wakim, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 462 days.

(21) Appl. No.: 13/434,003

(22) Filed: Mar. 29, 2012

(51) Int. Cl.
G06T 15/00 (2011.01)
G06T 13/00 (2011.01)
G09G 5/00 (2006.01)
G09G 5/02 (2006.01)
G01C 21/36 (2006.01)
G01C 21/00 (2006.01)

(52) U.S. Cl.
CPC ............ *G06T 15/00* (2013.01); *G01C 21/3682* (2013.01); *G01C 21/00* (2013.01); *G09G 5/00* (2013.01)

(58) Field of Classification Search
None
See application file for complete search history.

(56) References Cited

U.S. PATENT DOCUMENTS

| 2005/0251334 A1* | 11/2005 | Mizuno | 701/209 |
|---|---|---|---|
| 2009/0088964 A1* | 4/2009 | Schaaf et al. | 701/200 |
| 2009/0171570 A1* | 7/2009 | Chiba | 701/208 |
| 2011/0046879 A1* | 2/2011 | Celli et al. | 701/207 |
| 2011/0238690 A1* | 9/2011 | Arrasvuori et al. | 707/769 |
| 2012/0185419 A1* | 7/2012 | Kuhn et al. | 706/12 |
| 2012/0316782 A1* | 12/2012 | Sartipi et al. | 701/455 |
| 2013/0093787 A1* | 4/2013 | Fulks et al. | 345/629 |

OTHER PUBLICATIONS

Jacob et al., Guided by touch: tactile pedestrian navigation, Proceedings of the 1st international workshop on Mobile location-based service, Sep. 18, 2011, Beijing, China.*

* cited by examiner

*Primary Examiner* — Maurice L McDowell, Jr.
*Assistant Examiner* — Donna J Ricks
(74) *Attorney, Agent, or Firm* — Sutherland Asbill & Brennan LLP (57) ABSTRACT One or more points of interest (POI) are presented using point of interest indicators. The indicators are configured to encode information associated with the point of interest in one or more attributes. The indicators may comprise ideograms while the attributes encoding information may include ideogram color, background color, shading, relative size, animation, or a combination thereof. This encoding allows for compact and efficient transfer of information during presentation to a user.

21 Claims, 9 Drawing Sheets

SYSTEMS AND METHODS FOR PRESENTING POINT OF INTEREST INDICATORS

BACKGROUND

A wealth of map-related data is available to users on a variety of user devices. However, this wealth of data has been difficult to present in a comprehensible and accessible fashion to users.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Maps provide a useful way to present information to users. This information may include a representation of the physical arrangement of objects in the real world such as a street map, as well as other representations such as a functional representation of a mass transportation network such as a train system. Various locations, either physical in the case of a particular street address, or logical in the case of a particular station within the train system, may be of some significance to users. These locations of significance may be known as "points of interest." Some points of interest may be determined by an individual, such as a home address, while others may be of more general interest, such as the location of a park or restaurant.

User devices including smartphones, laptops, netbooks, desktop computers, tablets, vehicle navigation systems, and so forth, provide access to map-related information. Available information about points of interest has also grown to include more than simple name and location. As a result, traditional presentation of map information and points of interest may be cluttered, confusing, or otherwise difficult to understand.

Described herein are systems and methods for presenting point of interest indicators. A presentation provider is configured to generate instructions, which when executed on a user device, present one or more point of interest indicators. These point of interest indicators (or "indicators"), either visibly or non-visibly, encode data associated with the one or more points of interest.

The indicators may comprise one or more ideograms. These ideograms provide a graphical cue as to a particular type of data presented. For example, an ideogram may comprise a graphic of a coffee cup denoting a coffee shop, a knife and fork denoting a restaurant, or an airplane denoting an airport. In some implementations, the ideogram used may not resemble the type of data presented. For example, an ideogram for an automobile repair shop may be represented with a flower.

The ideogram encodes information about the point of interest. The ideogram may have one or more attributes which may be modified to encode additional data. For example, the color of the ideogram may be modified to denote whether the point of interest will be open for business upon arrival of the user. As a result, the user may quickly and easily view one or more points of interests and information associated with these informative point of interest indicators.

Illustrative System

Figure 1:
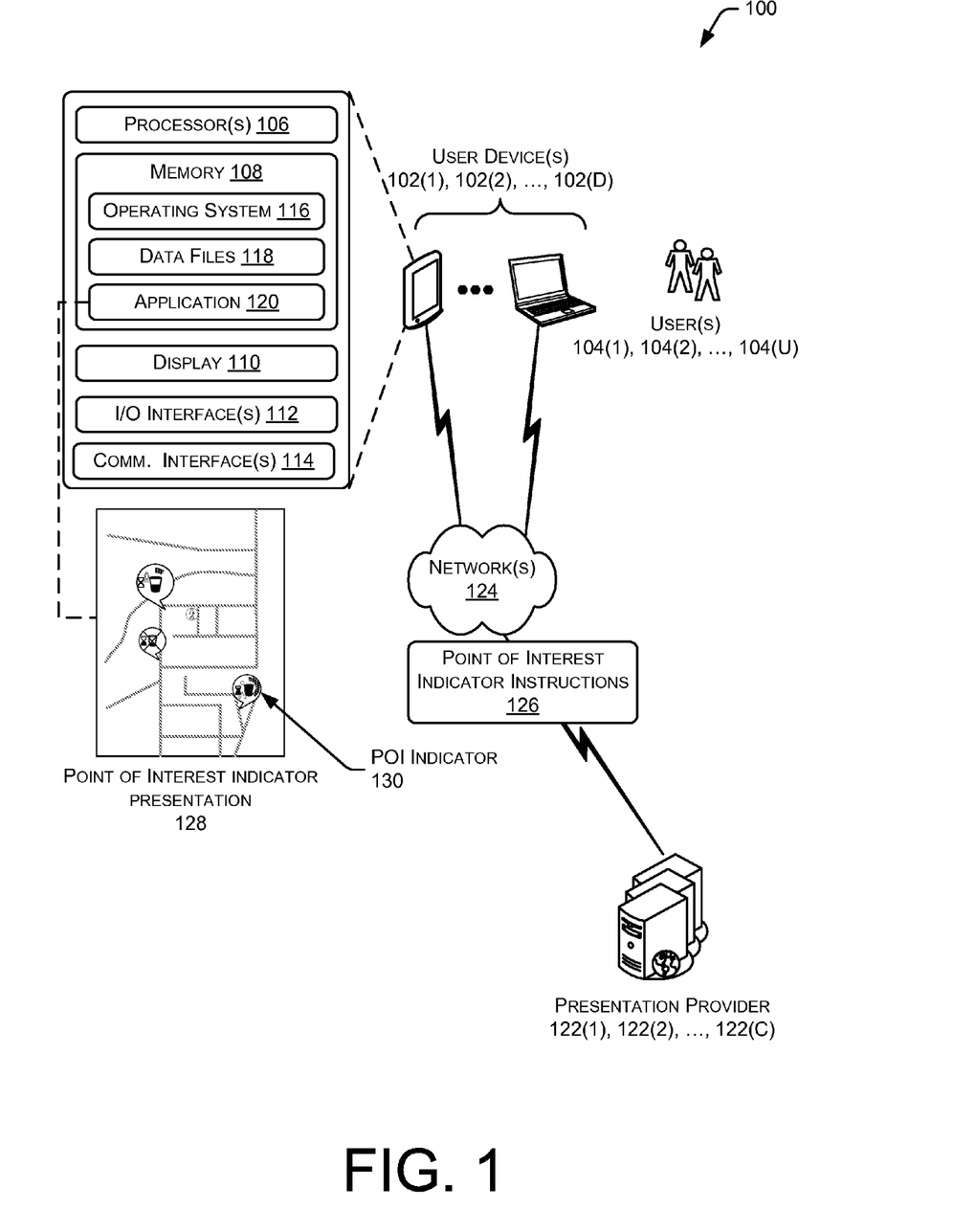
FIG. 1 illustrates a system for generating and presenting one or more point of interest indicators in accordance with an embodiment of the disclosure.

FIG. 1 illustrates a system 100 for generating and presenting one or more point of interest indicators in accordance with an embodiment of the disclosure. One or more user devices 102(1), 102(2), ... 102(D) may be used by one or more users 104(1), 104(2), ... 104(U). As used herein, letters enclosed by parenthesis such as "(U)" indicate an integer having a value greater than zero. The user devices 102 may include smartphones, laptops, desktops, tablet computers, televisions, set-top boxes, game consoles, in-vehicle computer systems, navigation systems, and so forth. The user devices 102 may comprise one or more processors 106, one or more memories 108, one or more displays 110, one or more input/output ("I/O") interfaces 112, and one or more communication interfaces 114.

The processor 106 may comprise one or more cores and is configured to access and execute at least in part instructions stored in the one or more memories 108. The one or more memories 108 comprise one or more computer-readable storage media ("CRSM"). The one or more memories 108 may include, but are not limited to, random access memory ("RAM"), flash RAM, magnetic media, optical media, and so forth. The one or more memories 108 may be volatile in that information is retained while providing power or non-volatile in that information is retained without providing power.

The display 110 is configured to present visual information to the user 104. The display 110 may comprise a reflective or emissive display configured to present images which appear to be two- or three-dimensional to the user 104. An emissive display emits light to form an image. Emissive displays include, but are not limited to, backlit liquid crystal displays, plasma displays, cathode ray tubes, light emitting diodes, image projectors, and so forth. Reflective displays use incident light to form an image. This incident light may be provided by the sun, general illumination in the room, a reading light, and so forth. Reflective displays include, but are not limited to, electrophoretic displays, interferometric displays, cholesteric displays, and so forth. The display 110 may be configured to present images in monochrome, color, or both. In some implementations the display 110 of the user device 102 may use emissive, reflective, or combination displays with emissive and reflective elements.

The one or more input/output interfaces 112 may also be provided in the user device 102. These I/O interfaces 112 allow for coupling devices such as keyboards, joysticks, touch sensors, cameras, microphones, speakers, haptic output devices, memory, and so forth to the user device 102. The haptic output device may comprise one or more actuators, signal generators, and so forth. For example, the haptic output device may generate direct electrical stimulation of nerves of the user 104, actuate a piezoelectric element, and so forth.

The one or more communication interfaces 114 provide for the transfer of data between the user device 102 and another device directly such as in a peer-to-peer fashion, via a network, or both. The communication interfaces 114 may include, but are not limited to, personal area networks ("PANs"), wired local area networks ("LANs"), wireless local area networks ("WLANs"), wireless wide area network ("WWANs"), and so forth. The communication interfaces 114 may utilize acoustic, radio frequency, optical, or other signals to exchange data between the user device 102 and another device such as an access point, a host computer, a router, a reader device, another user device 102, and the like.

The one or more memories 108 may store instructions for execution by the processor 106 to perform certain actions or functions. These instructions may include an operating system 116 configured to manage hardware resources such as the I/O interfaces 112 and provide various services to applications executing on the processor 106. The one or more memories 108 may also store data files 118 containing information about the operating system, mapping data, point of interest indicators, configuration files, and so forth.

An application 120 is stored in the one or more memories 108. The application 120 may comprise an Internet browser, a navigation application, and so forth. The application 120 is configured to present point of interest information via the display 110 or another output device coupled to the I/O interface 112. The application 120 may access the data files 118 or a presentation provider 122 via a network 124 to acquire one or more point of interest indicator instructions 126. The network 124 may comprise one or more private networks, public networks such as the Internet, or a combination of both configured to transfer data between two or more devices.

The point of interest indicator instructions 126 may comprise an executable code, a markup language, a script, a graphic file, and so forth. The application 120 may use the point of interest indicator instructions 126 to provide a point of interest indicator presentation 128 via the display 110, another output device, or a combination thereof. The point of interest indicator presentation 128 comprises one or more point of interest ("POI") indicators 130. As described below, these POI indicators 130 encode or otherwise represent information associated with a point of interest.

The presentation provider 122 generates the point of interest indicator instructions 126 such that the resulting POI indicators 130 encode various information about an associated point of interest. While the presentation provider 122 is depicted as a separate server, in some implementations, the presentation provider 122 or functionality associated therewith may be provided by the application 120 or another application executing at least in part on the user device 102. Generation of the point of interest indicator instructions 126 is discussed below in more detail with regards to FIG. 2. This presentation provider may comprise a server as shown, the user device 102, or a combination thereof. In some implementations map data and POI indicator instructions 126 may be provided by different devices. For example, the POI indicator instructions 126 may be received from the presentation provider 122 while the map data is retrieved from the data files 118 in the user device 102 or from another device. This map data and the POI indicator instructions 126 may then be presented at the user device 102.

While various functions are described above with respect to particular devices, it is understood that these functions may be distributed in many ways across the devices. In one example, the presentation provider 122 functionality may be provided at least in part by the user device 102. In another example, the application 120 of the user device 102 may access information from a third-party server in response to executing the point of interest indicator instructions 126 for presentation on the display 110.

Figure 2:
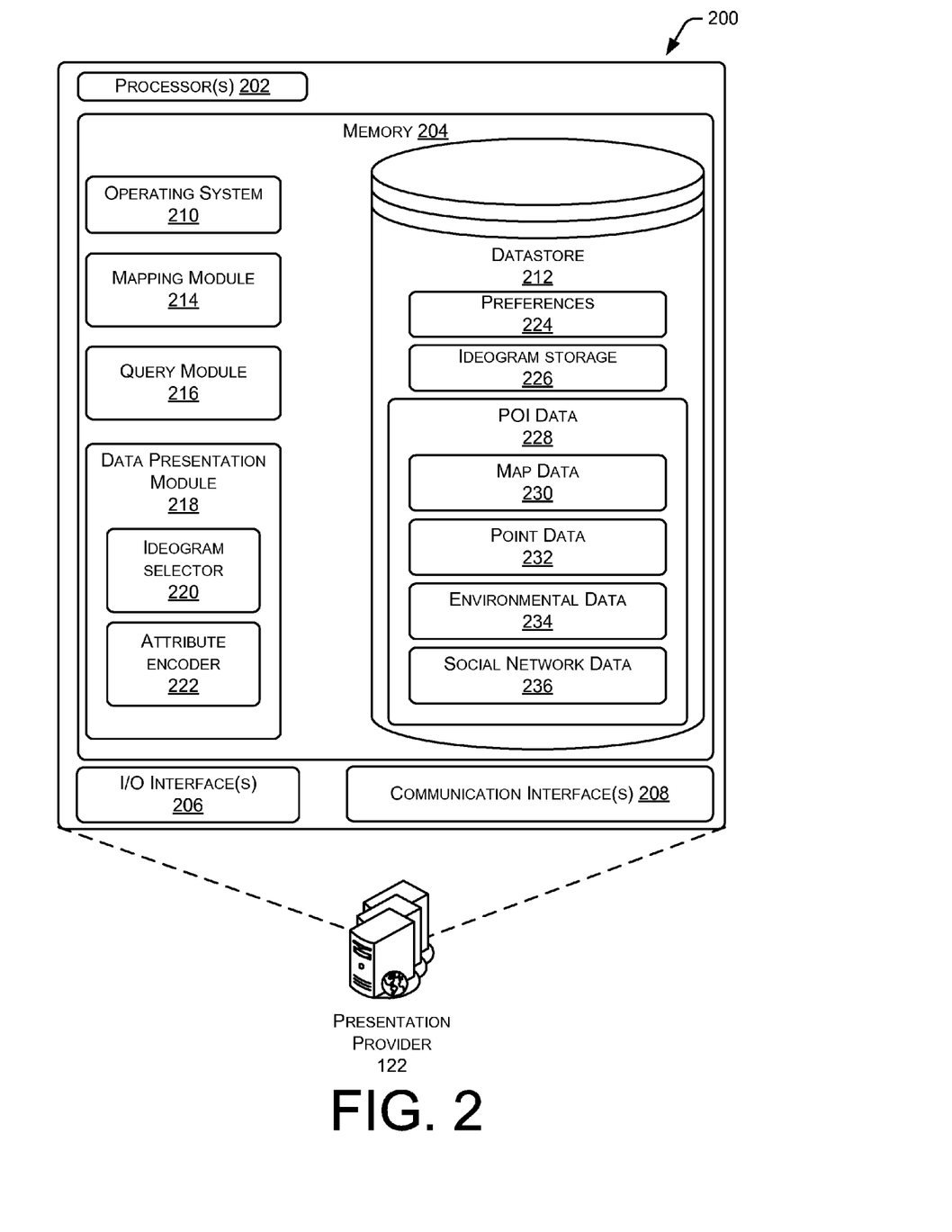
FIG. 2 illustrates a block diagram of a presentation provider configured to generate instructions for presenting point of interest indicators in accordance with an embodiment of the disclosure.

FIG. 2 illustrates a block diagram 200 of the presentation provider 122. The presentation provider is configured to generate point of interest indicator instructions 126. When executed, such as by the user devices 102, these indicator instructions 126 present POI indicators 130 to the user 104. The presentation provider 122 may be deployed in a standalone server such as depicted here, distributed across multiple servers, provided as a cloud service, reside as an application on the user device 102, and so forth.

The presentation provider 122 comprises one or more processors 202, one or more memories 204, one or more I/O interfaces 206, and one or more communication interfaces 208. The one or more processors 202 may individually comprise one or more cores and are configured to access and execute at least in part instructions stored in the one or more memories 204. The one or more memories 204 comprise one or more CRSM.

Similar to those described above, the one or more I/O interfaces 206 allow for coupling of devices such as displays, keyboards, storage devices, and so forth to the one or more processors 202 of the presentation provider 122. Likewise, the one or more communication interfaces 208 may be configured to couple the presentation provider 122 to one or more networks 124.

The one or more memories 204 may store instructions for execution by the one or more processors 202 which perform certain actions or functions. These instructions may include an operating system 210 configured to manage hardware resources, such as the I/O interfaces 206, and provide various services to applications executing on the one or more processors 202.

The one or more memories 204 may also store one or more datastores 212 containing information. These datastores may comprise lists, arrays, databases, flat files, and so forth. In some implementations, the datastores 212 may be stored in memory external to the presentation provider 122 but accessible via the network 124, such as with a cloud storage service. The datastore 212 may store a variety of information such as that described below.

A mapping module 214 is configured to generate, retrieve, process, or otherwise manipulate map-related information, such as from the datastore 212. These maps may comprise geographic maps such as street maps, functional maps such as a representation of a mass transportation network, and so forth. For example, the mapping module 214 may determine an estimated time to travel from a geographic location of the user to a geographic location associated with one or more points of interest.

A query module 216 is configured to generate, execute, or generate and execute queries against data such as in the datastore 212. These queries may be generated or executed at least partly in response to the mapping module 214, input from the user 104 via the user device 102, or both.

A data presentation module 218 is configured to accept data from the mapping module 214, the query module 216, or a combination thereof to generate the point of interest indicator instructions 126, which when processed by the user device 102 result in presentation of a POI indicator 130. The data presentation module 218 may comprise an ideogram selector 220 and an attribute encoder 222.

The data presentation module 218 may access preferences 224 stored in the datastore 212. These preferences 224 may indicate preferred settings or parameters associated with the user devices 102, the users 104, a third party such as a merchant, and so forth. For example, where the user devices 102 comprise a display 110 which is monochrome, the preferences 224 may record this constraint for use by the data presentation module 218 to encode information in a way which does not require color.

The ideogram selector 220 is configured to access one or more ideograms for use in the POI indicator 130 from ideogram storage 226, which may also reside at least in part in the datastore 212. As described above, the ideograms provide a graphical cue to the user. This graphical cue may be associated with a particular type of data presented, such as a category of business, relative ratings, and so forth. For example, the ideogram may cue the user as to the category of business, such as a coffee cup denoting a coffee shop, a knife and fork denoting a restaurant, an airplane denoting an airport, and so forth. The ideogram may thus encode or represent information about the point of interest. When the user 104 views the POI indicator 130, some meaningful information is thus conveyed. Selection of a particular ideogram associated with a particular point of interest may be pre-determined or dynamically determined.

The attribute encoder 222 is configured to modify one or more attributes of the ideograms to encode data. For example, the color of the ideogram may denote whether the point of interest will be open for business upon arrival of the user. The attributes, which may be modified to encode or represent information, are described below with regards to FIG. 3.

The data presentation module 218 may access POI data 228 from the datastore 212 during the generation of the point of interest indicator instructions 126. Based at least in part on this POI data 228, the ideogram selector 220 may select one or more ideograms, and the attribute encoder 222 may encode at least a portion of the POI data 228 or data derived therefrom. The POI data 228 may include map data 230, point data 232, environmental data 234, social network data 236, and so forth. The POI data 228 is discussed below in more detail with regards to FIG. 4.

Figure 3:
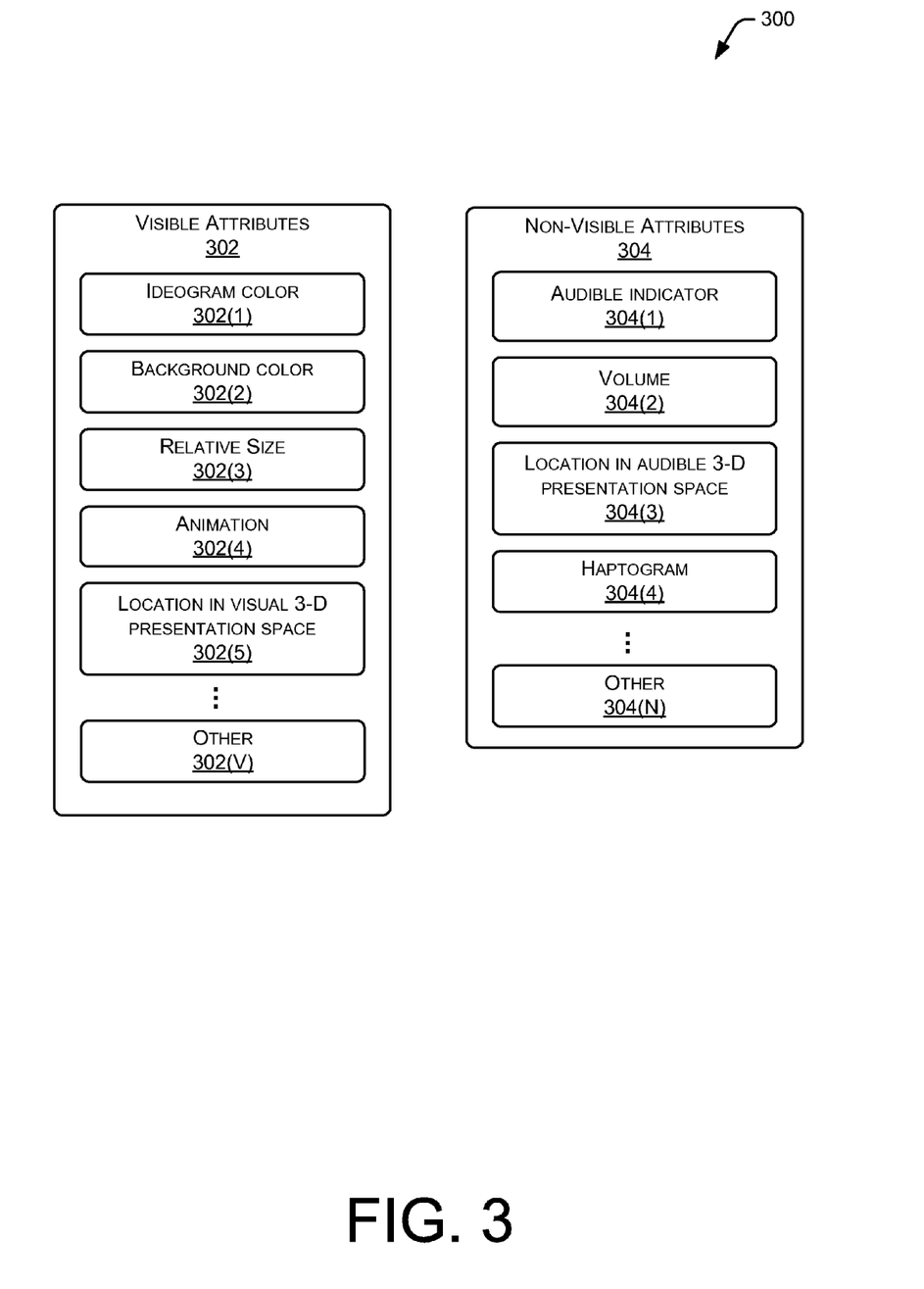
FIG. 3 illustrates attributes of point of interest indicators which may be modified to encode data in accordance with an embodiment of the disclosure.

FIG. 3 illustrates attributes 300 of POI indicators 130 which may be modified to encode data. These may be visible attributes 302 or non-visible attributes 304. The visible attributes 302 comprise those which are perceived by the eye of the user 104, such as color, shade, transparency, animation, and so forth. The non-visible attributes 304 include those perceived by the non-visual senses of the user 104, such as hearing and touch. By modifying one or more of these attributes 300, information associated with the point of interest may be encoded.

The visible attributes 302 may comprise an ideogram color 302(1) used to encode information. For example, different colors may be associated with different states of the point of interest. Thus, an ideogram color 302(1) of red may indicate that the point of interest is closed while green may indicate that the point of interest is open for business.

The attribute of a background color 302(2) may similarly be used to encode information. For example, a white background color 302(2) may indicate positive overall reviews by other users 104 while a black background color indicates negative overall reviews.

Relative size 302(3) of ideograms or portions thereof may encode information. The relative size 302(3) may be of one ideogram or portion thereof to another, or between two or more POI indicators 130. For example, the POI indicator 130 for a first parking garage which has ample parking may be twice the apparent size when presented on the display 110 as compared to a second parking garage which is almost full. In another implementation, the relative size 302(3) may encode a size of the point of interest, such as square footage, number of rooms, and so forth. The size may be encoded as a linear or non-linear change in the relative size 302(3). In another implementation the relative size 302(3) may encode a relative difference between the sizes of several points of interest. For example, a first point of interest which is three times the size of a second point of interest may be drawn with an ideogram three times larger, regardless of the absolute number of square feet in size for each.

Animation 302(4) of the ideogram or a portion thereof may encode information. For example, an apparent rotation of the coffee cup ideogram may indicate that the coffee shop associated with that POI indicator 130 has a relatively short wait for service. In some implementations, the rate of the animation may be proportionate to a metric associated with the encoded data. Continuing the example, a long wait for service may result in a slow animated rotation of the coffee cup, while the short wait results in a fast animated rotation.

As mentioned above, in some implementations, the display 110 of the user device 102 may be configured to present images which appear to be three-dimensional to the user 104. A location in visual 3-D presentation space 302(5) may be used to encode information. For example, points of interest which are reachable by the user 104 before close of business may be presented apparently close to the user, while those which would be closed upon estimated arrival are presented in the apparent distance.

Other 302(V) visible attributes such as shading, transparency, and so forth may also be used in some implementations. One or more of these visible attributes 302 may be used in various combinations with respect to a particular ideogram. Thus, the ideogram color, background color, relative size, animation, and apparent location in 3-D presentation space may simultaneously be used to encode information associated with the point of interest.

In some implementations, non-visible attributes 304 may be used instead of, or in addition to, the visible attributes 302 to encode information associated with the point of interest. An audible indicator 304(1) such as a particular sound or pattern of sounds may be used to encode information. For example, a sound of a train horn may be used to indicate that a point of interest is a rail station. Volume 304(2) of the sound may be varied to encode data. For example, a relatively low volume may indicate the train station has few trains departing while a relatively high volume may indicate many trains departing. Stereo or other sound spatialization techniques may be used to provide an apparent location in audible 3-D presentation space 304(3). Continuing the above example, train sounds which appear to be coming from the user's 104 left may indicate departing trains while those from the right may indicate arriving trains.

The non-visible attributes 304 may include a haptogram 304(4). A haptogram 304(4) is a haptic output which is associated with the point of interest. This haptic output may be generated by a haptic output device. In some implementations, the haptic output may be located to an area proximate to or corresponding with the POI indicator 130. The haptic output may be generated or presented continuously during presentation of the POI indicator 130, or when the user 104 touches a particular area, such as on the display 110 or another portion of the user device 102. Haptic output provides a touch sensation to the user 104, and a haptogram 304(4) comprises one or more apparent touch sensations or textures or other features or signals configured to generate a particular touch sensation. For example, the haptogram 304(4) providing for an apparently rough surface may indicate delays at the point of interest. In another example, the haptogram 304(4) may appear to convey a sensation of a ridge or surface feature around the point of interest, indicating that the point of interest charges a fee for entry. In some implementations, other non-visible attributes 304(N) may also be used.

Figure 4:
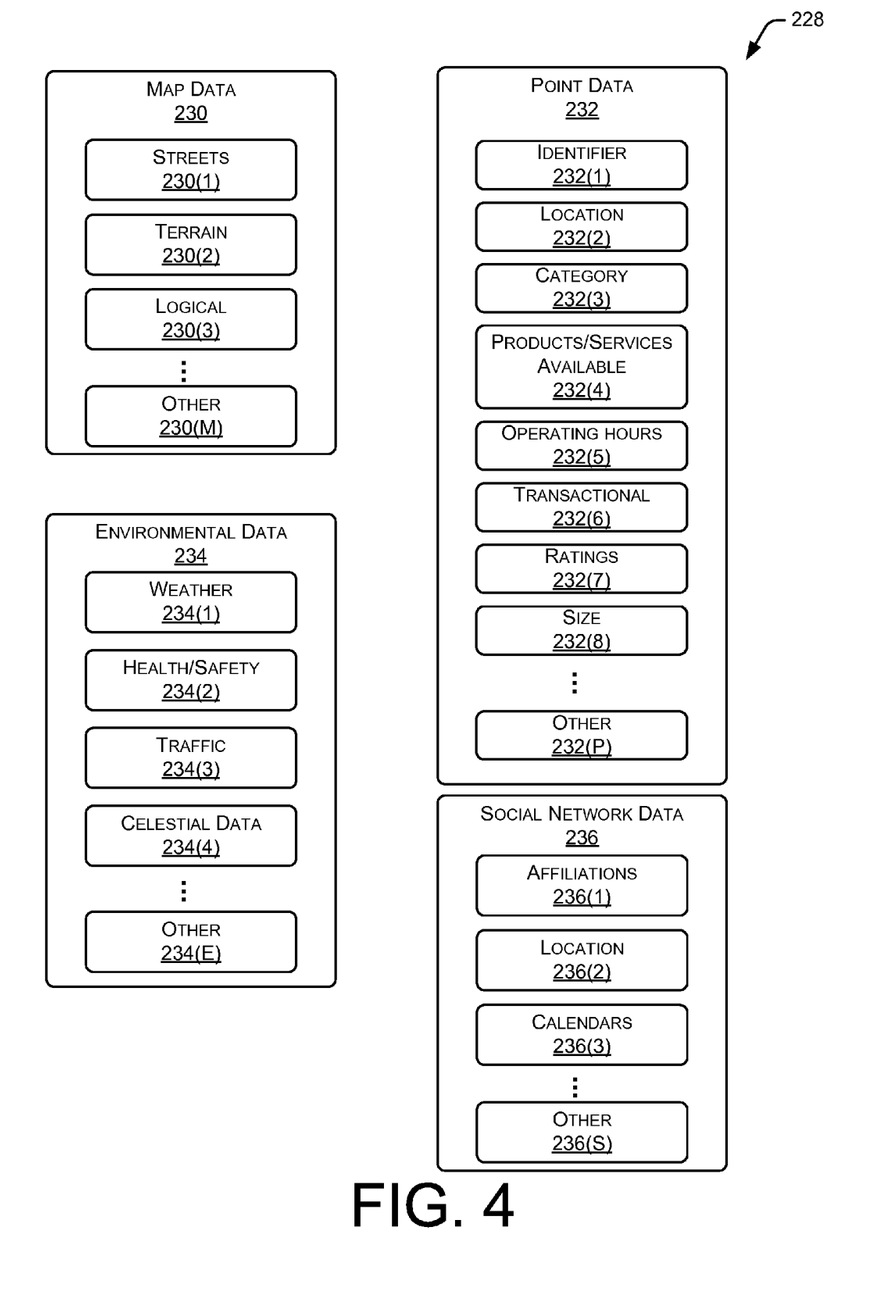
FIG. 4 illustrates data which may be encoded in accordance with an embodiment of the disclosure.

FIG. 4 illustrates POI data 228 which may be encoded or used to derive data which then may be encoded. As described above with regards to FIG. 3, attributes of the POI indicator 130 may be varied to encode information associated with the point of interest. The POI data 228 is the data used by the data presentation module 218 to modify those attributes 300. The POI data 228 may be generated automatically, provided by the users 104, or a combination thereof.

The map data 230 comprises a geographic or logical representation of a real or virtual world. This may include data such as layout of streets 230(1), terrain 230(2) such as topographic information, and so forth. This data may include a collection of geographic location points such as latitude and longitude, polygons associated with those points, and so forth. The map data 230 may also comprise logical 230(3) representations, such as the relative location of stations or stops along a mass transportation network. Other map data 230(M) may also be stored, such as altitude, composition, and so forth.

Point data 232 provides information associated with the point of interest. An identifier 232(1) such as a name, serial number, and so forth may be stored. A location 232(2) of the point of interest, either geographic or logical may be stored. Points of interest may be assigned a category 232(3) such as park, business, public safety, and so forth. Where appropriate, products or services available 232(4) may maintained.

While individual pieces of data are mentioned above with regards to the POI data 228, in some implementations, a plurality of pieces of data of the same kind may be stored. For example, the point data 232 for a particular point of interest may comprise a plurality of identifiers 232(1), categories 232(3), and so forth. Products/services available 232(4) may also be stored in the point data 232. This may be general such as "Italian food" or specific such as stocking a particular item from a specific manufacturer.

Operating hours 232(5) may be stored, which indicate dates and times of access associated with the point of interest. For example, the operating hours 232(5) may be the hours a zoo is open or visiting hours for a hospital.

In some implementations, transactional 232(6) information may be stored about the point of interest. Transactional 232(6) information includes, but is not limited to, information about sales of products or services, returns, chargebacks, and so forth. For example, the data presentation module 218 may be configured such that the attribute encoder 222 colors the ideogram red of a commercial point of interest which has experienced returns by customers above a threshold value.

Ratings 232(7) may be stored which are associated with the point of interest. These may be individual ratings such as from the users 104, ratings from a ratings agency, and so forth. Other 232(P) data about the point of interest may be stored such as the number of people currently there, estimated wait times, and so forth.

Size 232(8) of the point of interest may be stored as well. The size 232(8) may include square footage, number of floors, number of rooms, or other metrics regarding physicality or capacity of the point of interest. For example, the size 232(8) may be used to provide an ideogram indicative of whether the point of interest is a small kiosk or a major retail outlet. In some implementations, the relative size 302(3) of at least a portion of an ideogram may be based at least in part on the size 232(8).

The POI data 228 may also comprise environmental data 234. This may include weather 234(1), such as about meteorological conditions, either actual or predicted, for the point of interest or an area associated therewith. Health/safety 234(2) provides information about health, safety, or both associated with the point of interest. For example, the health/safety 234(2) data may provide information about crime rates associated with the point of interest, availability of health care, and so forth. Traffic 234(3) data may be actual or historical.

The environmental data 234 may be used by the mapping module 214 when determining the estimated time to reach the associated point of interest. For example, based on weather and traffic conditions, the mapping module 214 may determine that travel from the user's current location to the point of interest would take 45 minutes. The data presentation module 218 may use derived data to encode the travel time into the ideogram color 302(1) of an ideogram associated with the point of interest.

The environmental data 234 may also include celestial data 234(4). The celestial data 234(4) may include the relative position of the sun and moon and so forth. For example, the attribute encoder 222 may shade or alter the appearance of the ideogram associated with the point of interest to indicate that the point of interest would be in full sun or shade. Other environmental data 234(E), such as tide levels, ambient noise levels, air pollution levels, and so forth, may also be stored.

The social network data 236 provides information between and about users 104, points of interest, businesses, and so forth. This may include affiliations 236(1) indicating which users 104, businesses, and so forth are associated with another. Location 236(2) may give the geographic location of a particular user 104 or a group of users at a given instant in time, either current or historically. For example, a particular coffee shop is frequently visited by several of the user's 104 friends. Calendar 236(3) provides information such as where a particular user 104 is expected to be at a particular point in time, specials or other events occurring at the point of interest, and so forth. Other social network data 236(S) may be stored in the POI data 228, such as particular activities enjoyed by the user 104.

While the POI data 228 is depicted as being stored within the datastore 212 of the presentation provider 122, it is understood that the POI data 228 may be stored at least in part elsewhere. For example, the map data 230 may be stored at least in part on a mapping server, in cloud storage, in the memory 108 of the user device 102, and so forth.

Illustrative Point of Interest Indicators

Figure 5:
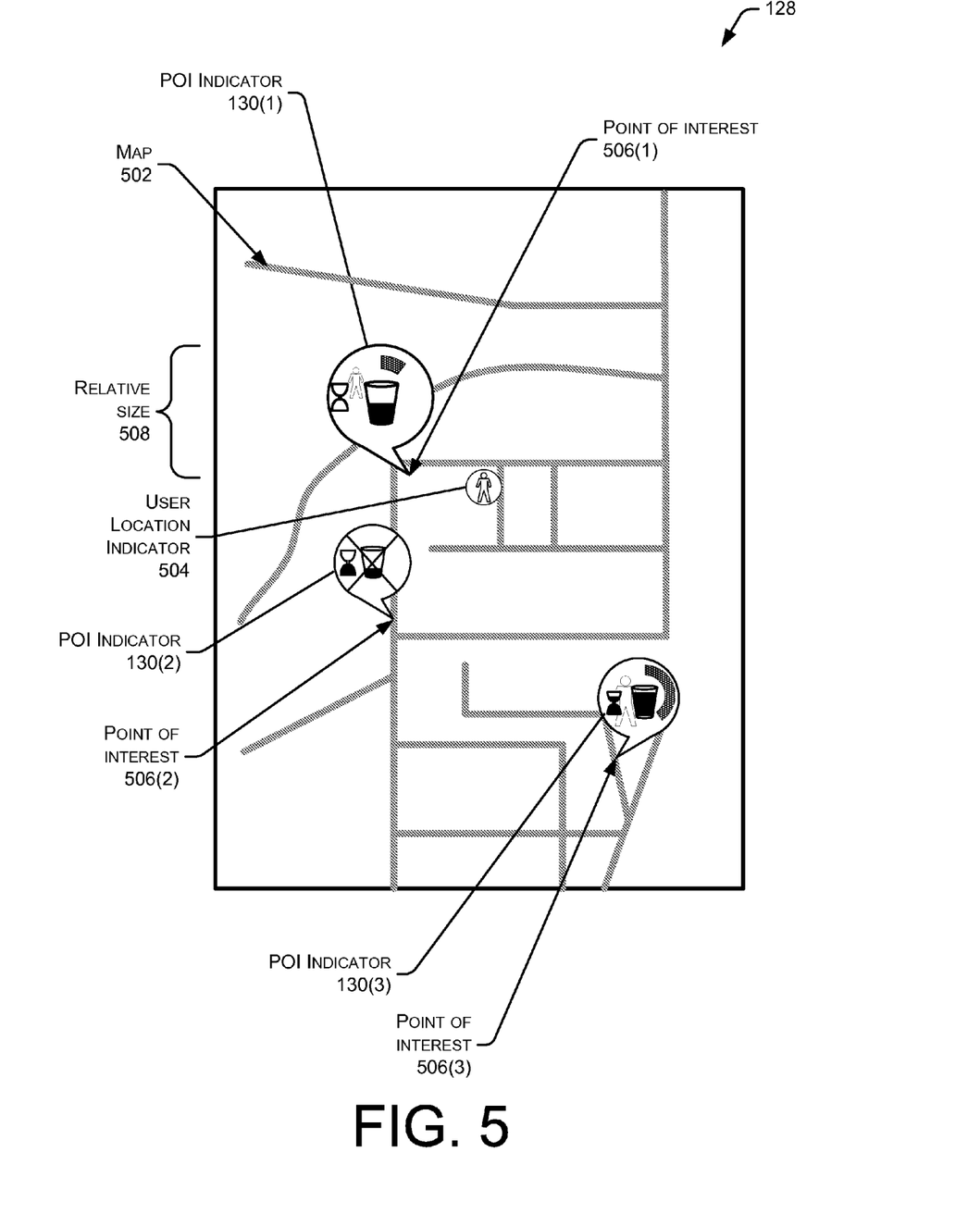
FIG. 5 illustrates presentation of a map with point of interest indicators presented in accordance with an embodiment of the disclosure.

FIG. 5 illustrates an enlarged view of the point of interest indicator presentation 128 on the user device 102. In this view, a map 502 provides a representation of a portion of the streets associated with a city. In other implementations, other types of maps, such as a representation of at least a portion of a logical representation of a mass transportation network, may be presented.

A user location indicator 504 indicates the geographic position associated with the user 104. This may be a current location, a previous location, or an anticipated location. For example, the user location indicator 504 may be placed at a particular location on the map according to data from a global positioning system ("GPS") receiver of the user device 102, based on a user's manual input of the particular location, and so forth.

As depicted here, three points of interest 506(1), 506(2), and 506(3) are defined at particular points. These points of interest 506 may be determined automatically, in response to a query by the user 104, or a combination thereof. For example, the user 104 may have queried for nearby coffee shops. As shown here by way of illustration and not as limitation, three coffee shops are present, one at each of the points of interest 506(1)-(3).

A POI indicator 130 is associated with a point of interest 506. As shown here, the POI indicator 130(1) is associated with the point of interest 506(1) and provides the user 104 with a visual cue as to the location and other encoded information associated with that coffee shop. The POI indicator 130 and the ideograms therein are discussed below in more detail with regards to FIGS. 6 and 7.

As mentioned above with regard to the attributes 300, the relative size 302(3) of the POI indicators 130 may encode data. For example, as shown here, a presented relative size 508 on the display 110, where the POI indicator 130(1) is larger than the POI indicators 130(2) and 130(3), may indicate that the point of interest 506(1) has been determined to be favored over the other coffee shop points of interest 506(2) and (3).

In some implementations the relative size 302(2) may be proportionate to the size 232(8) associated with the point of interest. For example, a point of interest indicator 130 for a 200 square foot shop in a shopping mall may be represented with a first size, and a second point of interest indicator 130 for a 1000 square foot shop may be presented at a larger second size. The proportionality may be linear, logarithmic, or expressed using another function or set of functions.

Figure 6:
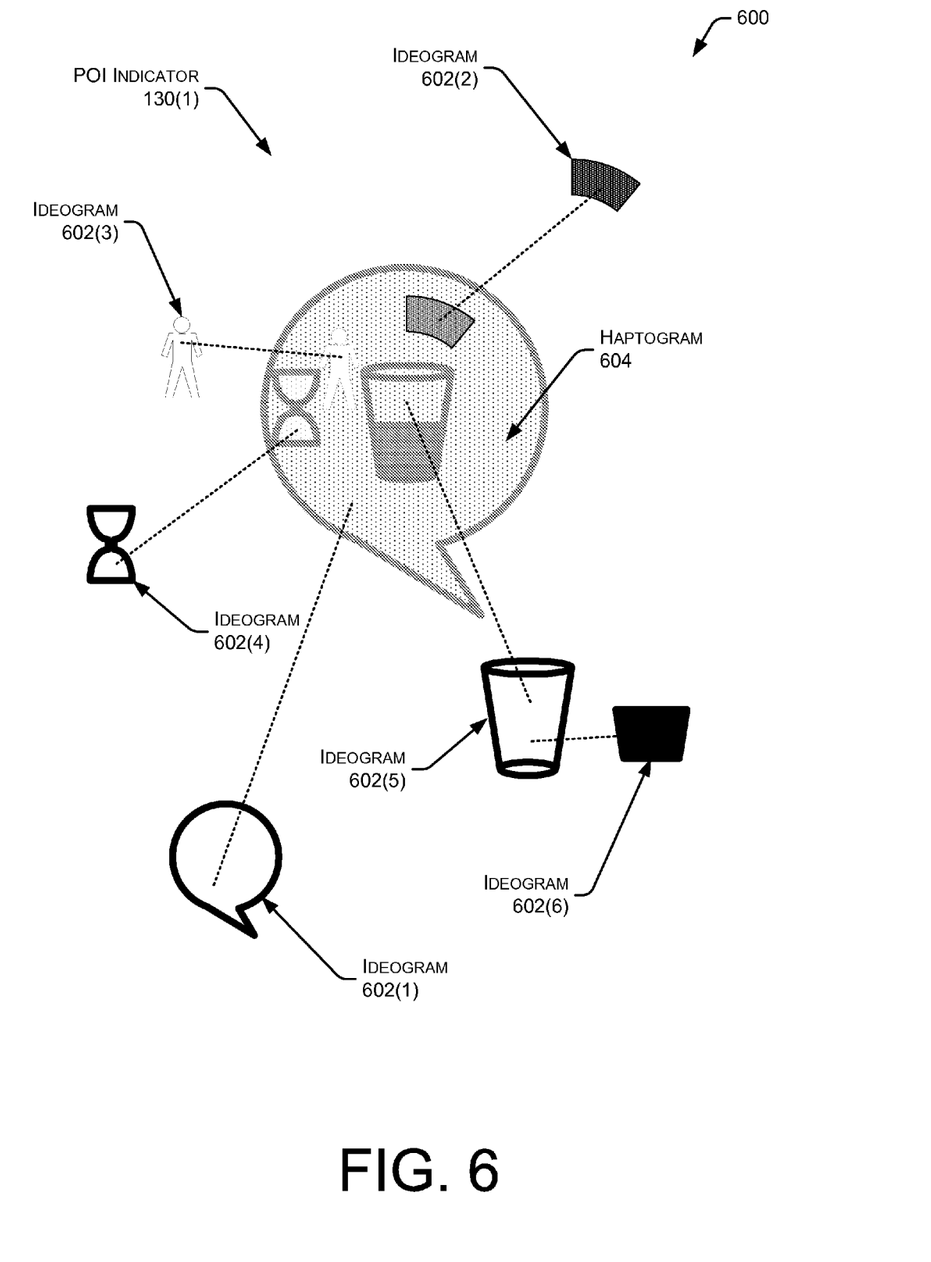
FIG. 6 illustrates an enlarged view of one of the point of interest indicators of FIG. 5 and the associated ideograms therein in accordance with an embodiment of the disclosure.

FIG. 6 illustrates an enlarged view 600 of the POI indicators 130(1) of FIG. 5. The POI indicator 130 may comprise one or more ideograms 602. These ideograms may be configured to provide a visual cue to the user as to the data encoded, so that the graphic corresponds to the data encoded. For example, a coffee cup ideogram is associated with a coffee shop. In other implementations, the ideograms may be configured to be distinctive but non-associative or weakly associative. For example, an ideogram depicting a section symbol "§" may be associated with an animal shelter.

This view shows that the POI indicator 130 comprises ideograms 602(1)-(6). This representation is by way of illustration and not as a limitation. The first ideogram 602(1) defines the outline or boundary of the POI indicator 130(1). While a "cartoon bubble" shape is depicted here, in other implementations, other shapes may be used. The second ideogram 602(2) depicts a graph or bar which may be varied to encode information. The third ideogram 602(3) depicts a human figure while the fourth ideogram 602(4) depicts an hourglass. Ideograms 602 may themselves comprise additional ideograms, such as 602(5) which depicts a cup and 602(6) which provides a variable element presented inside that cup. As described above, the ideograms 602 themselves as well as their attributes 300 may be modified to encode information. The data encoded by the ideograms is discussed next with regards to FIG. 7.

As mentioned above with regards to FIG. 3, other non-visible attributes 304 of the POI indicator 130 may be used to encode information. As depicted here, a haptogram 604 may be presented which encodes information in a way which is tactilely accessible. For example, the haptogram 604 may present an apparently rough surface indicating a crowded location at the point of interest 506.

Figure 7:
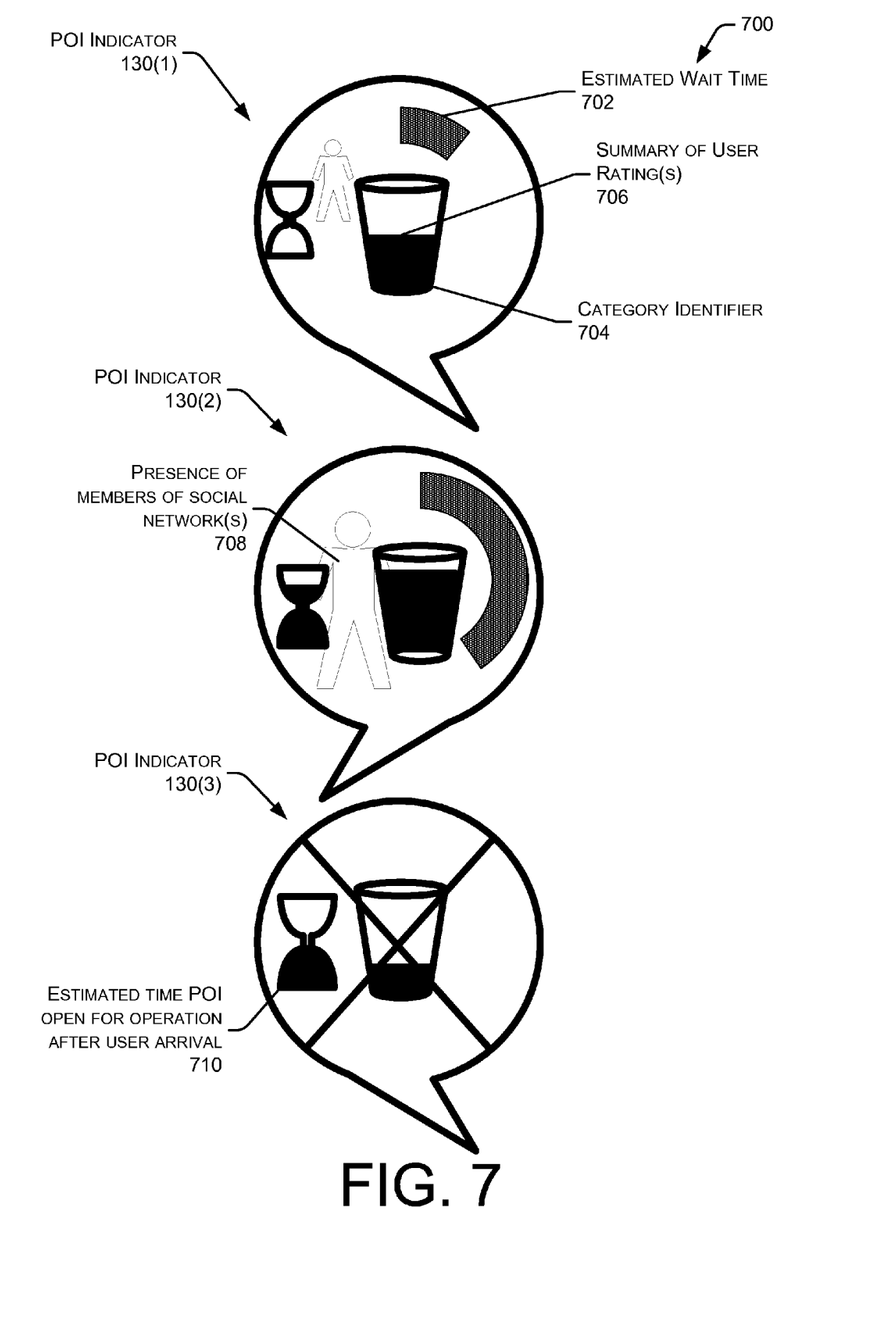
FIG. 7 illustrates an enlarged view of three point of interest indicators of FIG. 5 and the associated information encoded therein in accordance with an embodiment of the disclosure.

FIG. 7 illustrates an enlarged view 700 of the POI indicators 130(1)-(3) of FIG. 5. In this illustration, each of the POI indicators 130 is distinguishable from the others and provides a wealth of information to the user quickly and compactly.

The POI indicator 130(1) shows an estimated wait time 702 encoded in the length of the ideogram 602(2). As shown with regards to POI indicator 130(1), the estimated wait time 702 is shorter at the coffee shop associated with the point of interest 506(1) compared to the point of interest 506(2) associated with the POI indicator 130(2) which shows a very long wait.

The ideogram 602(5) of a coffee cup serves as a category identifier 704 indicating that the associated point of interest is a coffee shop. The height of the ideogram 602(6) provides a summary of user ratings 706 such that an apparently "full" cup of coffee as shown in the POI indicator 130(2) indicates a highly rated establishment while an apparently "empty" cup of coffee as shown at the POI indicator 130(3) indicates a low rated establishment.

The POI indicator 130(2) shows the ideogram 602(3) which encodes data associated with presence of members of one or more social networks 708. Compared to the similar ideogram of the POI indicator 130(1), a change in the relative size 302(3) of the ideogram 602(3) is depicted. For example, the relative size difference in the ideogram 602(3) between 130(1) and 130(2) indicates a greater count of members at that point of interest 506(2) compared to the point of interest 506(1).

The POI indicator 130(3) shows the ideogram 602(1) crossed out which may be used to indicate that the user 104 does not prefer this location. Also depicted is the ideogram 602(4) which is configured to show an estimated time the point of interest is open for operation after actual or estimated user arrival 710. For example, the presentation provider 122 may determine based at least in part on the POI data 228 the travel time from a current location of the user 104 to the point of interest 506(3). This estimated travel time may be compared with the operating hours 232(5) to determine a time interval at the point of interest 506(3) between arrival and closing time. As shown here in the POI indicator 130(3), the ideogram 602(4) indicates that some interval would remain before closing time of the coffee shop. In comparison, the ideogram 602(4) of the POI indicator 130(2) is almost "full" and indicates that time is running out, and that only a limited time would be available upon arrival.

Illustrative Processes

Figure 8:
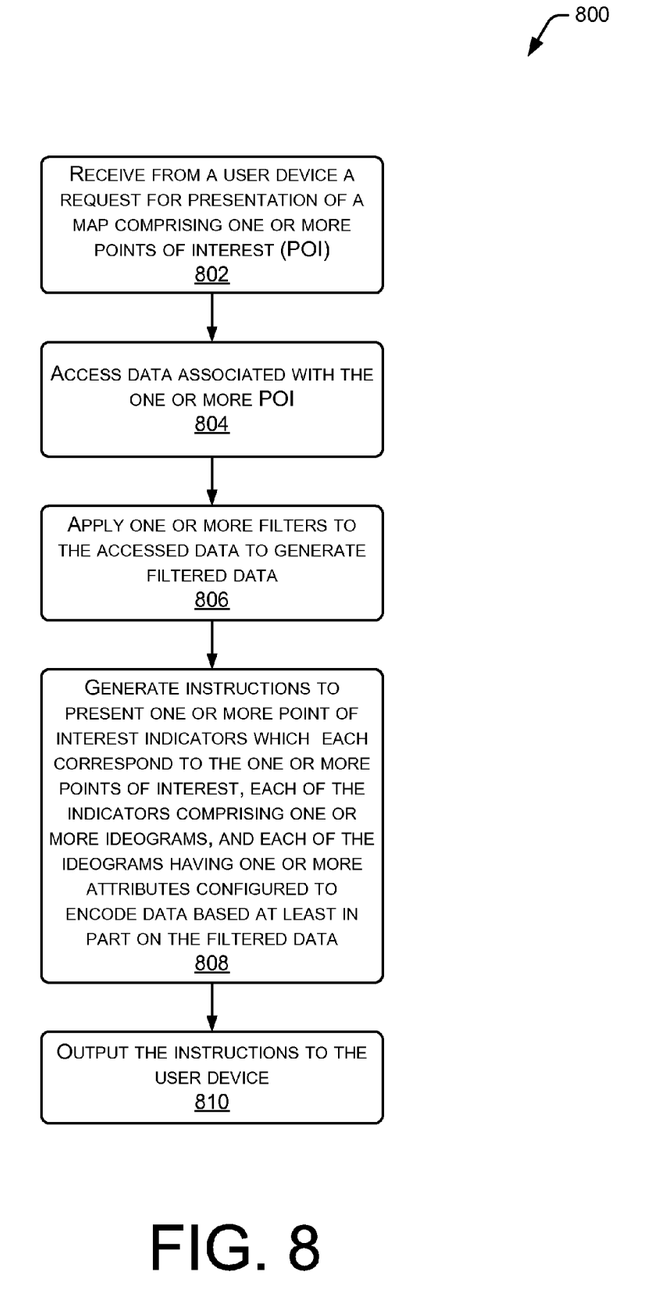
FIG. 8 illustrates a flow diagram of a process for generating instructions for presentation of one or more point of interest indicators in accordance with an embodiment of the disclosure.

FIG. 8 illustrates a flow diagram 800 of a process for generating instructions for presentation of one or more point of interest indicators in accordance with an embodiment of the disclosure. This process may be performed by the presentation provider 122, the user device 102, another device, or a combination thereof.

Block 802 receives a request for presentation of a map comprising one or more points of interest. This request may be received in some implementations from one or more of the user devices 102. For example, the user device 102 may receive an input from the user 104 which generates a query sent via the network 124 to the presentation provider 122.

Block 804 accesses data associated with the one or more points of interest. For example the mapping module 214 and the query module 216 may retrieve information about points of interest. This access may comprise reading memory or requesting data from another server via the network 124.

Block 806 applies one or more filters to the accessed data to generate filtered data. For example, the filters may comprise a pre-determined user preference stored in the preferences 224 which indicate that all points of interest which are more than a pre-determined travel time are to be omitted from presentation. In some implementations, the block 806 may be omitted, such as where the access at block 804 includes filtering or where filtering is undesired.

Block 808 generates one or more point of interest indicator instructions 126 comprising one or more instructions to present one or more graphical point of interest indicators which each correspond to the one or more points of interest. In some implementations, each of the indicators may comprise one or more ideograms 602 having one or more attributes configured to encode information based at least in part on the filtered or accessed data. This information may be encoded visually such as with the ideograms 602 and the visible attributes 302, as well as non-visually with the non-visible attributes 304. As described above, the visible attributes 302 may comprise one or more of the ideogram color 302(1), the background color 302(2), the relative size 302(3), animation 302(4), or the location in visual three-dimensional presentation space 302(5). As mentioned above, in some implementations, generating the instructions may comprise a haptogram associated with the one or more point of interest indicators.

The encoded information in the point of interest indicator instructions 126 may comprise a comparison between an estimated time to reach the point of interest and operating hours associated with the point of interest. This estimated time may be determined based at least upon the geographic location of the point of interest and a starting location such as input provided automatically or manually by the user 104. For example, the mapping module 214 may determine travel time based at least in part on the POI data 228 in the datastore 212.

In another implementation, the encoded information in the point of interest indicator instructions 126 may comprise a comparison between an estimated time to reach the point of interest and availability of a deal associated with the point of interest. For example, the point of interest may comprise a merchant who is offering a sale which ends at 3:00 p.m. The encoded information may be whether the point of interest is determined to be reachable before the sale ends.

The encoded information may also comprise a rating of the point of interest. As above, this rating may be retrieved from the POI data 228. In another implementation, the encoded information may comprise an expected wait time associated with the point of interest.

In some implementations, the one or more POI indicators 130 may omit textual information. For example, as shown above with respect to FIGS. 5-7, the POI indicators 130 may be free from text. This may be beneficial when presenting information to people conversant in different languages or for those which are illiterate such as young children. Conversely, in other implementations, the POI indicators 130 may comprise text associated with one or more of the plurality of ideograms.

Block 810 outputs the instructions 126 to the user device 102. For example, the presentation provider 122 may transmit the point of interest indicator instructions 126 via the network 124 to the user device 102. As mentioned above, in some implementations, the user device 102 comprising the display 110 or other output device may comprise the operational elements of the presentation provider 122, or at least a portion thereof. Thus, a block may output at least a portion of the instructions as graphics on the display 110, haptic output via a haptic output device, sound via one or more speakers, and so forth.

Figure 9:
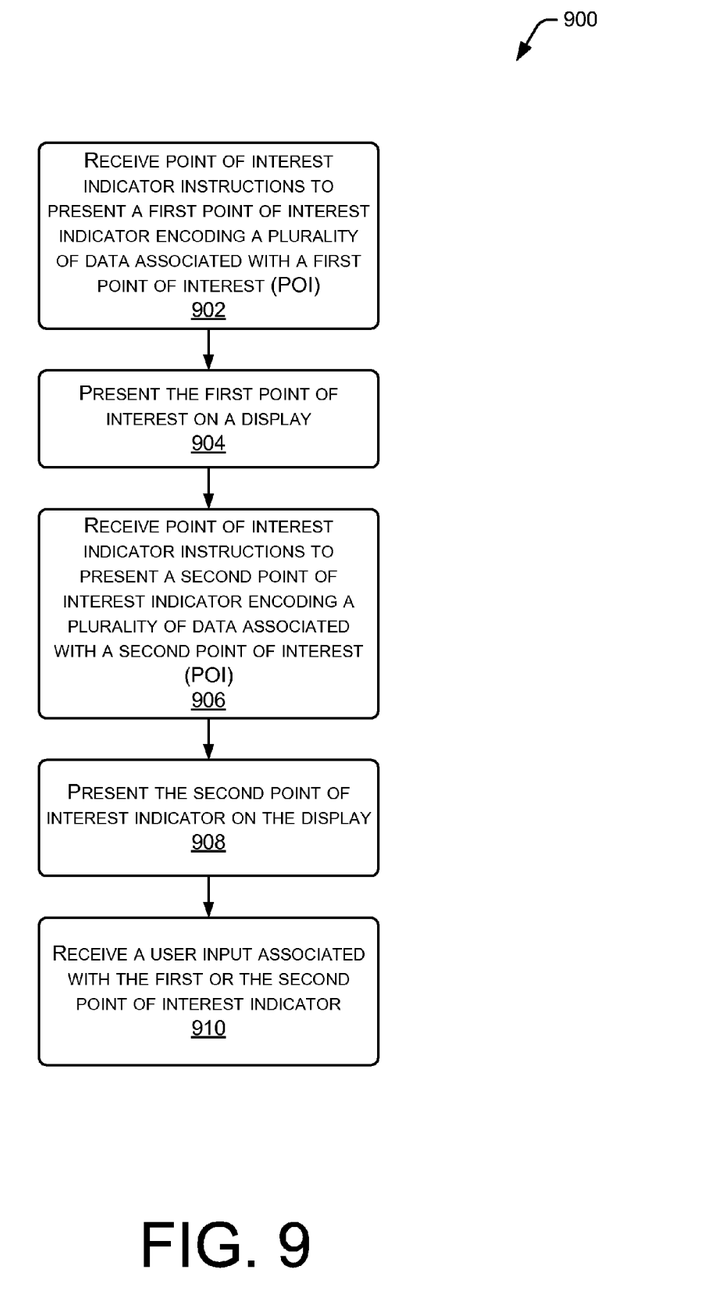
FIG. 9 illustrates a flow diagram of a process for receiving the instructions and presenting the point of interest indicators in accordance with an embodiment of the disclosure.

FIG. 9 illustrates a flow diagram 900 of a process for receiving the point of interest indicator instructions 126 and presenting the POI indicators 130. In some implementations, this process may be executed by the processor of the user device 102 with the display 110.

Block 902 receives point of interest indicator instructions 126 configured to present at least a portion of a first POI indicator encoding a first plurality of data associated with a first point of interest. For example, the instructions 126 may describe the POI indicator 130(1) as described above with regards to FIG. 5. The instructions 126 may comprise an executable code, a markup language, a script, a graphic file, and so forth.

Block 904 presents the first POI indicator 130 on the display 110. For example, the POI indicator 130(1) may be drawn on the display 110. Where the POI indicator 130 comprises non-visible attributes 304, those non-visible attributes may be presented using one or more appropriate output devices. For example, the audible attributes may be played using a speaker, haptograms may be generated using the haptic output device, and so forth.

Block 906 receives point of interest indicator instructions 126 configured to present at least a portion of a second POI indicator encoding a second plurality of data associated with a second point of interest. For example, the instructions 126 may describe the POI indicator 130(2) as described above with regards to FIG. 5.

Block 908 presents the second POI indicator 130 on the display 110. For example, the POI indicator 130(2) may be drawn on the display 110. As above, where the POI indicator 130 comprises non-visible attributes 304, those non-visible attributes may be presented using one or more appropriate output devices. As mentioned above, such as with regards to FIG. 6, the POI indicators 130 may comprise a plurality of ideograms 602. As also discussed above, the POI indicators 130 may comprise non-textual presentation of encoded data. This encoded data may be configured to present a relationship between an estimated time to reach the respective point of interest and operating hours associated with the respective point of interest. This encoded data may be configured such that the first plurality of data, the second plurality of data, or both comprise a relationship between an estimated time to reach the respective point of interest and operating hours associated with the respective point of interest.

As also described above, the presented POI indicators 130 may express data encoded in a plurality of attributes 300. These attributes may comprise one or more of the ideogram color 302(1), the background color 302(2), the relative size 302(3), animation 302(4), location in visual three-dimensional presentation space 302(5).

Block 910 receives a user input from the user 104 which is associated with the first or the second POI indicator 130. For example, where the user device 102 comprises a touch sensor, the user 104 may select the POI indicator 130 and associated point of interest by touching the POI indicator 130.

While POI indicators are discussed herein comprise graphical elements such as the ideograms 602, it is recognized that other non-graphical techniques may be used to present information to the user. Audible and haptic output devices may be used to present POI indicators, either in conjunction with, or in place of, graphical elements.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable code or program instructions. Likewise, some blocks of the block diagrams and flow diagrams may not necessarily need to be performed in the order presented, or may not necessarily need to be performed at all, according to some implementations.

These computer-executable code or program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system, comprising:
    at least one memory storing computer-executable code;
    at least one processor configured to access the at least one memory and execute the computer-executable code to:
        receive a request for presentation of a map comprising a first point of interest at a particular location;
        access data associated with the first point of interest;
        generate instructions to present a first graphical point of interest indicator corresponding to the first point of interest, the first graphical point of interest indicator comprising a first ideogram having a first size, wherein the first ideogram comprises attributes configured to graphically encode status information associated with the first point of interest based at least in part on the accessed data;
        generate instructions to present a second point of interest indicator corresponding to a second point of interest, the second point of interest indicator comprising a second ideogram, wherein the computer-executable code to generate the instructions to present the second point of interest indicator further configures the at least one processor to:
            determine a second size of the second ideogram with respect to the first size of the first ideogram based at least in part on a comparison of information associated with the second point of interest to information associated with the first point of interest.

2. The system of claim 1, the attributes comprising one or more of an ideogram color, a background color, a relative size, animation, or a location in visual three-dimensional presentation space.

3. The system of claim 1, the attributes configured to graphically encode information based at least in part on a comparison between an estimated time to reach the first point of interest and operating hours associated with the first point of interest.

4. The system of claim 1, the attributes configured to graphically encode information based at least in part on a rating of the first point of interest.

5. The system of claim 1, the attributes configured to graphically encode information based at least in part on an expected wait time associated with the first point of interest.

6. The system of claim 1, further comprising a display, wherein the at least one processor is further configured to execute the computer-executable code to output at least a portion of the instructions as graphics on the display.

7. The system of claim 1, wherein the first graphical point of interest indicator excludes text.

8. A system, comprising:
   at least one memory storing computer-executable code;
   at least one processor configured to access the at least one memory and execute the computer-executable code to:
      receive a request for presentation of a map comprising one or more points of interest;
      access data associated with the one or more points of interest; and
      generate instructions to present a first point of interest indicator of one or more point of interest indicators, the first point of interest indicator corresponding to a first point of interest of the one or more points of interest, the first point of interest indicator comprising a first ideogram having a first size, the first ideogram comprising attributes configured to represent status information associated with the first point of interest based at least in part on the accessed data, wherein the computer-executable code to generate the instructions further configures the at least one processor to:
         present a second point of interest indicator of the one or more point of interest indicators, the second point of interest indicator corresponding to a second point of interest of the one or more points of interest the second point of interest indicator comprising a second ideogram; and
         determine a second size of the second ideogram with respect to the first size of the first ideogram based at least in part on a comparison of information associated with the first point of interest to information associated with the second point of interest.

9. The system of claim 8, the first point of interest indicator comprising text associated with the respective ideograms.

10. The system of claim 8, further comprising:
    at least one haptic output device coupled to the at least one processor; and
    the computer-executable code comprising instructions to generate a haptogram associated with the first point of interest indicator with the at least one haptic output device.

11. The system of claim 8, the one or more points of interest comprising geographic locations.

12. The system of claim 8, the map comprising a representation of a mass transportation network.

13. The system of claim 8, the attributes comprising one or more of a relative size, animation, or texture.

14. The system of claim 8, the represented status information based at least in part on a comparison between an estimated time to reach the first point of interest and operating hours associated with the first point of interest.

15. The system of claim 8, the represented status information based at least in part on a comparison between an estimated time to reach the first point of interest and availability of a deal associated with the first point of interest.

16. One or more non-transitory computer-readable storage media storing computer-executable code that, when executed by at least one processor, configure the at least one processor to perform operations comprising:
    receiving point of interest indicator instructions to present a first point of interest indicator comprising ideogram attributes configured for encoding first status information associated with a first point of interest;
    presenting the first point of interest indicator on a display;
    receiving point of interest indicator instructions to present a second point of interest indicator comprising ideogram attributes configured for encoding second status information associated with a second point of interest;
    presenting the second point of interest indicator on the display; and
    determining a first size of a first ideogram associated with the first point of interest indicator with respect to a second size of a second ideogram associated with the second point of interest indicator, the determination based at least in part on a comparison of information associated with the first point of interest to information associated with the second point of interest.

17. The non-transitory computer-readable storage media of claim 16, the operations further comprising receiving user input associated with the first or the second point of interest indicator.

18. The non-transitory computer-readable storage media of claim 16, the first or the second point of interest indicators comprising non-textual presentation of encoded data.

19. The non-transitory computer-readable storage media of claim 16, the first point of interest indicator configured to present a relationship based at least in part on an estimated time to reach the first point of interest and operating hours associated with the first point of interest.

20. The non-transitory computer-readable storage media of claim 16, wherein the first status information is based at least in part on a relationship between an estimated time to reach the first point of interest and operating hours associated with the first point of interest.

21. The non-transitory computer-readable storage media of claim 16, the ideogram attributes comprising one or more of an ideogram color, a background color, a relative size, animation, or a location in visual three-dimensional presentation space.

* * * * *